(12) United States Patent
Kühn et al.

(10) Patent No.: US 7,684,800 B2
(45) Date of Patent: Mar. 23, 2010

(54) METHOD OF TRIGGERING A HANDOVER

(75) Inventors: Edgar Wolfram Kühn, Stuttgart (DE); Oliver Blume, Stuttgart (DE)

(73) Assignee: Alcatel Lucent, Paris (FR)

( * ) Notice: Subject to any disclaimer, the term of this patent is extended or adjusted under 35 U.S.C. 154(b) by 817 days.

(21) Appl. No.: 11/486,282

(22) Filed: Jul. 14, 2006

(65) Prior Publication Data
US 2007/0026861 A1    Feb. 1, 2007

(30) Foreign Application Priority Data
Jul. 27, 2005   (EP)   ................... 05291617

(51) Int. Cl.
*H04W 36/00* (2009.01)
*H04W 4/00* (2009.01)

(52) U.S. Cl. ........................... 455/436; 370/331
(58) Field of Classification Search ............... 455/436, 455/502, 432.1, 67.11, 456.1, 456.2, 342, 455/357.01; 370/331, 338, 351, 335, 310
See application file for complete search history.

(56) References Cited

U.S. PATENT DOCUMENTS

2004/0022214 A1* 2/2004 Goren et al. ............... 370/332
2004/0259555 A1* 12/2004 Rappaport et al. .......... 455/446
2005/0159166 A1   7/2005 Jonsson et al.
2006/0276189 A1* 12/2006 Kiernan et al. ............. 455/436

FOREIGN PATENT DOCUMENTS

EP    1 418 782    5/2004

OTHER PUBLICATIONS

TKN: "Optimization of Handover Performance by Link Layer Triggers in IP-Based Networks." Aug. 2002.
3GPP: "3rd Generation Partnership Project." Release 6, 3GPP TS 25.413 V6.0.0, Dec. 2003.
3GPP: "3rd Generation Partnership Project; Technical Specification Group Services and System Aspects (Release 6)." 3GPP TS 23.107 v6.1.0, Mar. 2004.

* cited by examiner

*Primary Examiner*—Melody Mehrpour
(74) *Attorney, Agent, or Firm*—Fay Sharpe LLP

(57) ABSTRACT

A method of triggering a decision of a wireless communication system on a handover and/or of triggering a handover by means of at least one trigger signal. Using a generic algorithm for triggering handover trigger signals. The algorithm uses generic parameters representing at least an aspect of the quality of service of a radio link. The method facilitates handovers in multi-RAT networks and decreases the signalling as part of the handover decision making is transferred to the terminal device.

13 Claims, 1 Drawing Sheet

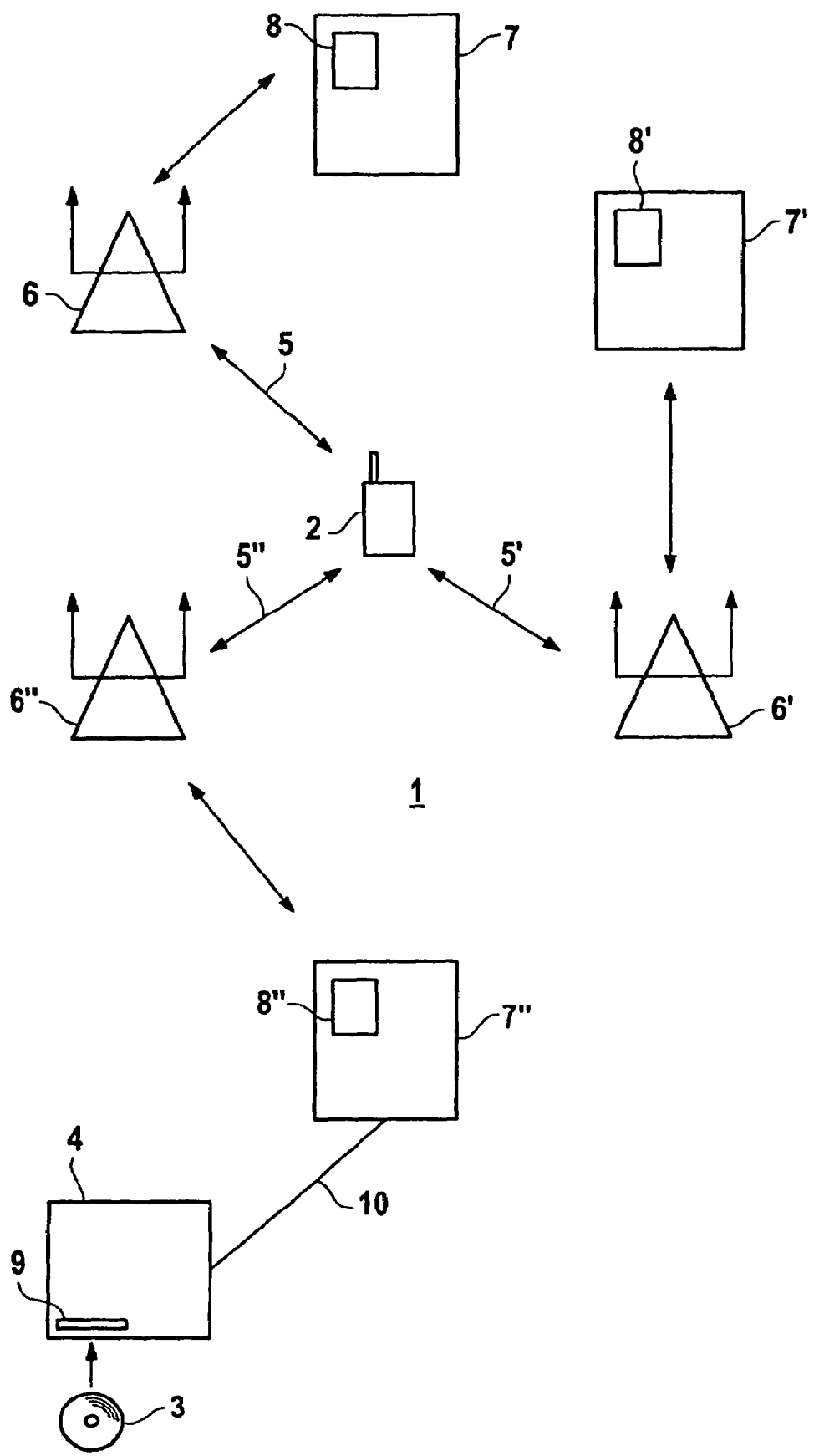

METHOD OF TRIGGERING A HANDOVER

FIELD OF THE INVENTION

The invention is based on a priority application EP 05291617.8 which is hereby incorporated by reference.

The invention relates to a method of triggering a decision of a wireless communication system on a handover and/or of triggering a handover by means of at least one trigger signal. Furthermore, it relates to a corresponding computer program product and to devices comprising such a computer program product. The invention can be used in heterogeneous networks, to facilitate seamless vertical and horizontal handovers.

BACKGROUND AND PRIOR ART

The evolution of cellular mobile communication networks beyond the third generation and the introduction of new broadband wireless access technologies such as WiMAX open the way to heterogeneous networks with a diversification of RATs (radio access technologies). In many cases providers offering the same RAT compete with each other on the market. Furthermore, a provider may offer services of different RATs to a user. As an example, a provider may provide UMTS (universal mobile telecommunications system) services as well as WLAN (wideband local area network) services. In such a situation the user is interested in having a radio link which offers the best quality of service (QoS) for the application which runs on his terminal device which might be a mobile phone, a notebook or the like.

The best quality of service for a particular application running on the terminal device depends on many factors. Furthermore, the significance of the factors vary in time such that a radio link which is the best one at some time might be outperformed by another radio link later on. As a consequence it is desirable to change the radio link from time to time in order to have always the best quality of service. This change of radio link is commonly called a handover.

In the prior art the desired application determines the RAT. If, for example, a high data rate is desired, e.g. for downloading music or a video file, WLAN is probably the best choice. If however, the user is interested in video telephony, UMTS is a good choice. If the RAT has been specified it is necessary to identify the best radio link with a communication system with this RAT. At a later time a horizontal handover might be necessary when reception conditions change, i.e. a handover without changing the RAT.

To ensure the best quality of service it needs to be known which quality the individual radio links offer. One approach is that the terminal carries out measurements and reports the results to the communication system to which he has already established a connection. The system then determines the best radio link, and arranges a handover to such a radio link if appropriate. This works quite well when the radio links are always of the same type, i.e. when the radio link connects the terminal device with communication systems using the same RAT. In this case the approach has one drawback: the more radio links become available the more signalling between the terminal device and the communication system is necessary. This however worsens the scalability, i.e. the ratio between the signalling load and the working load.

The approach mentioned in the penultimate paragraph may lead to situations where radio links of a first type remain rather unused, and whereby radio links of a second type are heavily asked for. An example would be a situation where only a few users ask for UMTS links, e.g. for video telephony, but many user ask for WLAN links, e.g. for music download. In this case the data rate for the WLAN links may drop to a low value which could also be offered by a UMTS link. In this case a vertical handover from the WLAN link to the UMTS link would be appropriate to guarantee the best quality of service.

A problem with vertical handovers is that each RAT has its own definition which specify the quality of a radio link. When a terminal device is expected to operate in a multi-RAT environment the quality of two radio links can hardly be compared. Comparing the measurement results can, if at all, only be done with complex algorithms which map such values of a first RAT into values which can be understood by a second RAT. Furthermore, numerous algorithms of this kind are necessary to compare measurement values of several RATs with each other. The signalling of the measurement results mentioned in the last paragraph and the processing of the complex algorithms consume a significant time such that in many cases a handover takes a few seconds. As a consequence, seamless handovers in a multi-RAT environment are difficult to achieve.

In the document A. Festtag, "Optimization of handover performance by link layer triggers in IP-based networks: parameters, protocol extensions and APIs for implementation", TKN technical report TKN-02-014, T U Berlin, version 1.0, August 2002, two phases of a handover process are identified: a handover detection and triggering phase and a handover execution phase. In order to speed up the first phase the authors suggest the definition of a link layer trigger for a handover. A parameter for this link layer trigger is an abstract measure of a signal quality. This abstract measure is obtained by a mapping of RAT-specific measurement values into this abstract measure.

SUMMARY OF THE INVENTION

It is an object of the invention to carry out handovers in heterogeneous network which require less signalling between a terminal device and a wireless communication system.

Another object of the invention is to facilitate seamless handovers in heterogeneous networks.

This object and other objects are solved by the features of the independent claims. Preferred embodiments of the invention are described by the features of the dependent claims. It should be emphasized that any reference signs in the claims shall not be construed as limiting the scope of the invention.

The above-mentioned object is solved by a method with which a decision of a wireless communication system on a handover is triggered by means of at least one trigger signal. The method is thus usable in systems such as GSM systems or UMTS systems where the network is responsible for handover decisions. In this case the terminal device sends at least one trigger signal to trigger or initiate a handover decision by the wireless communication system. Then it's up to the communication system to decide whether a handover should be carried out or not. Furthermore, the method is a method for triggering a handover by means of at least one trigger signal. In the latter case the method can be used by systems such as WLAN systems or WiMAX systems where the terminal device is responsible for handover decisions. In this case the terminal device sends at least one trigger signal to the communication system which carries out the handover as instructed.

The method makes use of an algorithm which is generic, i.e. which can be used by many radio access technologies such as UMTS, GSM, WiMAX, WLAN, GRPS, Bluetooth or others. In a first step of this method values of parameters of this algorithm are determined. The parameters are generic parameters which quantify at least an aspect of the quality of service of a radio link. Each radio link is then characterized by a set of such generic QoS parameters.

Each generic QoS parameter is suitable to quantify at least an aspect of the quality of service of a radio link. The set of generic QoS parameters then serve to characterize the overall radio link quality. The generic QoS parameters may be identical to the QoS parameters known from UMTS or WLAN and may especially include:

the mean and peak data rate (kbit/s)
the packet delay (ms)
the delay jitter (ms)
the maximum packet loss rate (%) or the bit error rate or the block/frame error rate (per 0/00).

A more comprehensive list of QoS parameters are listed in Table 1 for the case of UMTS systems. These are the radio access bearer attributes as defined in 3GPP document TS 23.107 V.6.1.0 and TS 25.413 V.6.0.0. Table 2 shows the QoS parameters for WLAN systems according to IEEE 802.11e.

The QoS parameters may however differ from the QoS parameters known from UMTS or WLAN in order to take considerations of other RATs into account. This modified set of generic QoS parameters may be agreed upon in a standardization process. In the following description QoS parameters will always be generic QoS parameters unless otherwise indicated.

The advantage of generic QoS parameters as used by the method according to the invention is that, if they are delivered to layer 3 or 3.5 or to a generic link layer on layer 2.5, they can be directly compared between two or more RATs. This means that systems operating with different RATs can easily interpret the QoS parameters of systems with another RAT as they use the same parameters, or simply speaking because they use the same language. This is however a prerequisite for anticipating aspects of the radio link quality for possible vertical handovers.

In a first step of the method generic QoS parameters of a radio link are determined. In most cases all parameters of the above-mentioned set of generic parameters are determined. This determination can be done by the terminal device and/or by the wireless communication system as will be explained below in more detail.

In a second step of the invention the above-mentioned generic algorithm is processed whereby the generic parameters are used as an input. The algorithm might be a metric or may be based on heuristic rules. In the case of a metric its output may be a matrix, a vector, or a scalar value. This output quantifies the overall quality of the corresponding radio link.

In a third step it is decided whether a trigger signal has to be transmitted from the terminal device to the communication system. This is done on the basis of the output of the algorithm. If the algorithm is based on heuristic rules it may immediately yield a yes-or-no decision for the handover. If the algorithm is a metric its output has to be interpreted, whereby the way of interpretation may depend on the operator policy or on marketing considerations of the network operator. If the algorithm outputs a scalar value it may be decided to transmit a trigger signal if the scalar value is smaller than a threshold value. This is reasonable when the threshold indicates a minimum quality of service of the radio link.

A more sophisticated way of carrying out the third step can be chosen when the first and the second step are carried out for a multitude of radio links. In this way the radio link quality of a multitude of radio links is determined. Then a ranking can be performed to distinguish the (overall) quality of the radio links. As an example, a trigger signal can be transmitted if the ranking of the radio link currently serving a terminal device is not the best one. As a matter of fact, the result of the quality ranking can be transmitted from the communication system to the terminal device or vice versa. In general, a ranking can be carried out by the mobile terminal or by the communication system, in latter case by the serving access point or by a radio resource management server.

Apart from using the overall radio link quality for identifying the ranking position of a radio link a separate algorithm for the ranking can be implemented. This additional algorithm can also make use of more complex criteria for a handover. The more complex criteria may use QoS parameters and parameters other than QoS parameters. An example of a more complex criteria is using a measure for the respective received signal strength of the corresponding radio link (which yields the maximum deliverable data rate at the actual link condition) combined with the actual data rate and values of QoS parameters as required by the application.

Furthermore, the more complex criteria may include user preferences, network load, operator policy or operator cost functions for the delivery of the required data rate and the quality of service. Further criteria are listed below. Many other ranking schemes can be developed according to technical and economic preferences. Essential is that the ranking algorithm is determined by the network operator, is downloaded to the terminal device, and is updated on this device if necessary. The algorithm may allow to adjust certain parameters to allow the provision of user preferences, but only under the terms and conditions as defined by the network operator by means of the ranking algorithm.

In a fourth step of the method a trigger signal is sent from the terminal device to the communication system if the result of the third step had been to send a trigger signal. If the network is responsible for handover decisions the reception of the trigger signal will be taken into account in the internal decision making as far as a possible handover is concerned. In this case the decision may be to carry out a handover or not. If the terminal device is responsible for the handover decision sending a trigger signal will always be followed by a handover.

One advantage of the method as described above is that handovers, in particular vertical handovers, are facilitated. The use of the method makes it possible to anticipate and to compare the link quality of radio links, whereby the radio links may belong to the same RAT or to different RATs. This is however a prerequisite for seamless handovers, in particular seamless vertical handovers.

A major advantage of the method is the reduced overhead, in particular for those systems where the network is responsible for handovers. The reason is that measurement values which are used in deciding upon handovers are not transferred to the communication system but are processed in the terminal device where they are generated. The processed measurement values may be the generic QoS parameters mentioned above. Instead of measurement values only a few trigger signals, if any, are transferred depending on the output of the algorithm.

Another advantage of the method is that the handover decisions in the network need less resources as a part of the decision making is transferred to the terminal device which acts as an autonomous unit.

Still another advantage of the invention is that it has the potential of increasing the network efficiency and the load distribution in the network.

When a ranking of the radio link qualities is carried out as explained above the signalling over the air is drastically reduced as further signalling is only necessary when the ranking changes.

Another advantage of the method materializes when it is carried out with a computer program for deciding on handovers.

The computer program for deciding on handovers becomes less complex when the method according to the invention is carried out, and requires less maintenance. In addition, taking into account newly emerging RATs becomes easier, as the basic structure of the algorithm for deciding on handovers already exists and needn't be programmed from scratch.

There are quite a few possibilities of determining generic QoS parameters. One possibility is to measure and/or estimate QoS parameters which are specific for a particular RAT and to map or transform them into generic QoS parameters. As an example, UMTS-specific QoS parameters may be mapped into generic QoS parameters. This means that existing algorithms for determining RAT-specific QoS parameters can still be used, and that only an additional piece of software is necessary to map the RAT-specific QoS parameters into generic QoS parameters. The mapping comprises information which is specific to only one single RAT, and is thus fully within the scope of OSI layer 2.

A second possibility of determining generic QoS parameters is to measure and/or estimate them directly. This is useful for a communication system offering services with several RATs. In this case the computer program for the determination of the QoS parameters is simplified as only a single algorithm is necessary instead of a multitude of algorithms for each RAT.

Another possibility of determining generic QoS parameters consists in receiving them. If it is the terminal device which determines the QoS parameters it may receive further generic QoS parameters from the communication system. In the alternative the mobile terminal may receive further RAT-specific QoS parameters from the communication system for mapping or transforming them into generic QoS parameters. The reception of parameters by the terminal is advantageous when RAT-specific or generic QoS parameters can't be determined by the terminal device itself such as statistical data on medium usage. Furthermore, the received QoS parameters may be parameters from system information data bases which also contribute to the quality of service such as the type of the application
capabilities such as hardware features and supported protocol options and access information
operator policy
network load for a load balancing between RATs and networks
the supported mobility in the RAT, e.g. a typical cell radius or a maximum tolerated user velocity
the signaling load and latency for the handover,
the cost of link operation
the security level
dedicated access rights, e.g. in a non-public area of the network or in areas with restricted access
user subscription restrictions and user preferences the latter e.g. due to connection costs.

If it is the communication system which determines the QoS parameters it may receive further generic QoS parameters from the terminal device. In the alternative the communication system may receive further RAT-specific QoS parameters from the terminal device for mapping or transforming them into generic QoS parameters. QoS parameters to be received by the communication system may be the type of the application
measured QoS parameter such as link budget or data rate
capabilities such as hardware features and supported protocol options
the user position or velocity
the time delay to switch between RATs (zero indicating parallel usability of both RATs in the terminal,
dedicated access rights such as stored on a SIM card
user preferences due to connection costs Instead of receiving the QoS parameters themselves it is also possible to receive only mathematical representations of them. The mathematical representation might be an intermediate value which can be inserted into the algorithm, e.g. a metric, to calculate the radio link quality. The exact nature of this intermediate value depends strongly on the metric which is used. As an example, the communication system may determine 15 generic QoS parameters and may send an intermediate value representing these 15 parameters. The terminal device determines 10 generic QoS parameters itself, and uses them together with the intermediate value to calculate the value of the metric. As a further example, this approach is possible when the metric consists of the product of all QoS parameters. In this case the mathematical representation is the product of the above-mentioned 15 QoS parameters. This product is then multiplied with the 10 QoS parameters determined by the terminal device. This approach has the advantage to reduce the signalling load.

As a matter of fact, it is not only possible to receive mathematical representations of generic QoS parameters, but also mathematical representations of RAT-specific QoS parameters. In this case the mathematical representation might be an intermediate value usable in the algorithm which maps the RAT-specific QoS parameters into generic QoS parameters.

In a preferred embodiment of the invention the values of the metric are scalar values. In this case comparing the quality of different radio links is particularly easy. As an example, a large value of the metric might indicate a link with good overall quality of service for an application, whereas a low value would indicate a link with bad overall quality of service.

In another preferred embodiment of the invention the metric is a configurable metric. Configurable means that parameters, namely parameters of the metric which are not QoS parameters, can be adjusted such that the terminal device or the communication system may adapt the metric to the specific situation, e.g. to the type of the application or to the operator policy. Furthermore, the configuration may be used to adjust the metric to a situation with limited availability of the QoS parameters, e.g. to calculate the metric results using only the QoS parameters it is able to determine but not those it would need to receive.

A configurable metric has the advantage of reducing the signalling between the terminal device and the communication system. The reason is that the configurable metric allows identifying radio links showing an unacceptably low radio link quality. As an example, the QoS parameters determined by a terminal device may indicate clearly that a radio link is unsuitable for internet browsing because its data rate is too low. In such a case the QoS parameters of this radio link is not transmitted to the communication system or the terminal device respectively as further calculations are unnecessary. This reduces the overhead by avoiding a transmission of QoS parameters, or mathematical representations of them, which will not be used for a future access anyway.

In a preferred embodiment of the invention the metric is calculated according to the formula $$\prod_i (f_i(x_i))^{\alpha_i},$$

whereby $f_i(x_i)$ is a mathematical function with $$x_i = \frac{QoS_{determined}(i)}{QoS_{application}(i)},$$

whereby $QoS_{determined}(i)$ are the determined QoS parameters as explained above. $QoS_{application}(i)$ are the corresponding QoS parameters as requested by an application running on the terminal device.

i is an integer ranging from 1 to N, whereby N is the number of determined QoS parameters. $\alpha_i$ are weighting factors.

In general $QoS_{application}(i)$ are maximum allowed values or minimum allowed values of generic QoS parameters for a particular application. Examples for a conversational application would be a delay in the MAC layer of less than 50 ms a jitter of less than 5 ms a bit-error-rate of less than 1%

For browsing in the internet $QoS_{application}(i)$ might be a delay in the MAC layer of less than 150 ms a data rate of more than 1 MBit/s a bit-error-rate of less than 0.1%

With the weighting factors $\alpha_i$ the metric becomes a configurable metric with which the metric can be adapted to the specific application running on the terminal device. The reason is that each application requires a specific set of QoS parameters. As an example, a MAC layer delay will have a higher weighting for a real-time application than for a background service. In the latter case the corresponding exponent $\alpha_i$ might be set to one or even to zero. The weighting factors thus allow the determination of an application-specific link quality, and thus of a link quality measure which is specifically tailored to the demand of the user or to the operator. Furthermore, it might however be necessary to find a certain compromise value for these weighting factors in the case that the user uses different applications at the same time. In a further embodiment the metric mentioned above is calculated with $f_i(x_i)=x_i$.

The calculation of the quality metric as disclosed above may yield unreasonable values in those cases in which one of the QoS parameters has an unacceptably low value, e.g. a value which is below a predefined threshold value. This can be compensated by complementing the metric with a clipping function, whereby the QoS component having this unacceptably low value is clipped to zero. This can be done by operating a clip function on some or all of the QoS ratios in the metric. This approach sets the whole metric to zero, such that this radio link will be disregarded in the quality ranking mentioned above. This avoids that a low measurement value of a first QoS parameter can be compensated by a high measurement value of a less important second QoS parameter.

Correspondingly, an over-provisioning of the QoS parameter may be clipped to a maximum value in the metric. In this case a QoS parameter in the metric shall not regard to have a value which is higher than the requested value. An example would be a radio link offering a data rate of 54 MBit per seconds for a video streaming which requires only 384 kBit/s. In this case the corresponding value of $QoS_{determined}(i)$ is set to 384 kBit/s for all those values which are larger than 384 kBit/s.

When the surmounting data rate doesn't further increase the term in the metric all links with sufficient bandwidth are counted equivalently. Thus, the clipping retains the significance of other parameters like delay or loss. In this case handovers can be restricted to those cases in which the target cell offers a new useful QoS improvement for the application.

According to a preferred embodiment of the invention each factor of the product of the metric is modified by a clip function $$clip_i(x_i) = \begin{bmatrix} 0 & \text{for } x_i < \min_i \\ x_i & \text{for } \min_i < x_i < \max_i \\ \max_i & \text{for } \max_i < x_i \end{bmatrix} \text{ with } x_i = \frac{QoS_{determined}(i)}{QoS_{application}(i)}$$

whereby $\min_i$ represents a minimum allowed value and $\max_i$ a maximum allowed value of the quantity. Using this clipping function can be done by the terminal device as well as by the communication system.

In a further preferred embodiment the weighting factors $\alpha_i$ are updated from time to time and transmitted from the communication system to the terminal. This takes into account that the weighting factors will in most cases be operator-specific and subject to his policy, and may be changed from time to time to reflect changes of this policy. In such a case the determination of the parameters of the radio links may be carried out by the terminal device which calculates the values of the metric after having received the weighting factors from the communication system.

In a further preferred embodiment the terminal device transmits a trigger signal to the communication system if the serving radio link is not the best radio link according to the ranking. In this case the best radio link, or a radio link which is better than the serving radio link according to the quality ranking, can be selected as a future serving radio link for a handover. This is especially useful when the handover decision is network based but shall for load reasons be decided not after each measurement but only in case of relevant events. Only when the terminal detects (by the use of its configured metric) such an event, it transmits a trigger signal to the network decision function. This trigger signal may include all or selected measured QoS parameter and a proposed handover target. The network then takes the final decision on the target link and on the proper timing for carrying out a handover.

It goes without saying that the method as disclosed above can be carried out by a computer program. This computer program might be stored on the appropriate storage medium such as the CD or DVD, or may be transmitted by means of electrical carrier signals over a network such as the Internet.

These and other aspects of the invention will be apparent from and elucidated with reference to the embodiments thereafter. It should be noted that the use of reference signs shall not be construed as limiting the scope of the invention.

BRIEF DESCRIPTION OF THE DRAWINGS AND TABLES

FIG. 1 shows a communication system using the invention,

Table 1 lists QoS parameters for UMTS systems.

Table 2 lists QoS parameters for WLAN systems.

Table 3 lists generic QoS parameters as requested by an application,

Table 4 lists generic QoS parameters as determined by a mobile terminal,

Table 5 lists exponents of the quality metric,

Table 6 lists values of the metric with clipping,

Table 7 lists values of the metric without clipping.

DETAILED DESCRIPTION OF THE DRAWINGS AND OF THE PREFERRED EMBODIMENT

The only FIGURE shows a communication system 1 which is using the invention. A mobile terminal 2 may establish radio links 5, 5', 5" to base stations 6' and 6" respectively. Base station 6 is a node B offering UMTS services, base station 6' is a node B offering UMTS and high speed downlink packet access (HSDPA) services, and base station 6" is a hot spot offering WLAN services. Each base station 6, 6' and 6" is in communication with a corresponding radio resource controller 7,7',7", each of which comprises a radio resource management system 8, 8',8". For sake of simplicity base stations 6, 6' and 6" belong to the same provider.

A system component 4 of the communication system 1 is connected with a fibre optic 10 to RNC 7". It includes an optical disk drive 9 for insertion of DVDs 3.

The provider has the possibility to transmit a metric from system component 4 via fibre optic 7, RNC 7" and hot spot 6" to terminal 2, namely the metric $$f = \prod_i \left( \frac{QoS_{measured}(i)}{QoS_{application}(i)} \right)^{a_i} \quad \text{(equation 1)}$$

The nature of the factors of this metric have been described above.

Table 3 shows QoS parameters as requested by an application of the terminal 2, this means $QoS_{application}$, for three different applications, namely video telephony, video streaming and a music download.

Table 4 shows the QoS parameters as measured by the terminal 2 at an example channel loss of one or two percent respectively. The metric, which is used for a calculation of the quality of the radio links is as follows:

$$f = \left( \frac{\text{available\_rate}}{\text{mean\_rate}} \right)^r * \left( \frac{\text{actual\_delay}}{\text{max\_delay}} \right)^d * \left( \frac{\text{actual\_loss}}{\text{max\_loss}} \right)^l \quad \text{(equation 2)}$$

Table 5 lists the exponents $a_1=r$, $a_2=d$, and $a_3=l$ as used in the metric. The terminal 2 receives the metric of equation 2 and the parameters $QoS_{application}(i)$, $i=\{1,2,3\}$, from the communication system 1, and stores them in its internal memory (not shown). It regularly measures the above-mentioned generic parameters directly.

Table 6 and 7 show the values of the metric. In the case of table 6 a clipping has been performed for those cases in which a factor of equation 2 is larger than 1. In this case the factor has been clipped to 1.

As can be derived from table 6 the best radio link for video telephony is access point 5 offering UMTS services only, access point 5' offering UMTS and HSDPA services is the best base station for video streaming, and hot spot 5" is the best base station for music downloads.

Table 7 shows the corresponding values of the quality metric in those cases in which no clipping has been performed. In the case of node B 5 offering UMTS services and servicing the terminal 2 with video streaming a very large number is obtained, namely 33,33. This is a high ranking even though the data rate is rather poor. The reason is that there is an overprovision of the delay requirement of a factor of more than 200.

| List of Reference Numerals | |
| --- | --- |
| 01 | wireless communication system |
| 02 | terminal |
| 03 | computer readable medium |
| 04 | system component |
| 05 | radio link |
| 05' | radio link |
| 05" | radio link |
| 06 | node B |
| 06' | node B |
| 06" | hot spot |
| 07 | radio resource controller |
| 07' | radio resource controller |
| 07" | radio resource controller |
| 08 | radio resource management (RRM) system |
| 08' | radio resource management (RRM) system |
| 08" | radio resource management (RRM) system |
| 09 | optical disk drive |
| 10 | cable |

TABLE 1

| Traffic class | Conversational class | Streaming class | Interactive class | Background class |
| --- | --- | --- | --- | --- |
| Maximum bitrate | X | X | X | X |
| Delivery order | X | X | X | X |
| Maximum SDU size | X | X | X | X |
| SDU format information | X | X | | |
| SDU error ratio | X | X | X | X |
| Residual bit error ratio | X | X | X | X |
| Delivery of erroneous SDUs | X | X | X | X |
| Transfer delay | X | X | | |
| Guaranteed bit rate | X | X | | |
| Traffic handling priority | | | X | |
| Allocation/Retention priority | X | X | X | X |
| Source statistics descriptor | X | X | | |
| Signalling Indication | | | X | |

TABLE 2

| Element ID (13) | Length (55) | TS Info | Nominal MSDU Size | Maximum MSDU Size | Minimum Service Interval | Maximum Service Interval | Inactivity Interval | Suspension Interval |
| --- | --- | --- | --- | --- | --- | --- | --- | --- |
| Octets: 1 | 1 | 3 | 2 | 2 | 4 | 4 | 4 | 4 |

| Service Start Time | Minimum Data Rate | Mean Data Rate | Peak Data Rate | Burst Size | Delay Bound | Minimum PHY Rate | Surplus Bandwidth Allowance | Medium Time |
| --- | --- | --- | --- | --- | --- | --- | --- | --- |
| Octets: 4 | 4 | 4 | 4 | 4 | 4 | 4 | 2 | 2 |

TABLE 3

| QoS application | Video telephony (real time) | Video streaming 10 sec buffered | Music download (50 MByte File) |
|---|---|---|---|
| Minimum data rate | 16 kBit/sec | 16 kBit/sec | 384 kBit/sec |
| Mean data rate | 128 kBit/sec | 384 kBit/sec | 3000 kBit/sec |
| Maximum data rate | 384 kBit/sec | 1000 kBit/sec | 30000 kBit/sec |
| Maximum delay | 0.1 sec | 10 sec | 10 sec |
| Delay variance | 0.01 sec | 5 sec | 5 sec |
| Maximum packet loss rate | 5% | 1% | 10% |

TABLE 4

| QoS measured | UMTS | UMTS HSDPA | WLAN |
|---|---|---|---|
| Maximum data rate | 384 kBit/sec | 2000 kBit/sec | 54000 kBit/sec |
| Available data rate | 64 kBit/sec | 384 kBit/sec | 2000 kBit/sec |
| Available delay | 0.05 sec | 0.2 sec | 2 sec |
| Available delay variance | 0.01 sec | 0.01 0.01 sec | 1 sec |
| Available packet loss rate | 1% | 1% | 2% |

TABLE 5

| Application | Video telephony | Video streaming | Music download |
|---|---|---|---|
| r | 1 | 1 | 2 |
| d | −2 | −1 | 0 |
| l | −1 | −1 | −1 |

TABLE 6

| with clipping | UMTS | UMTS HSDPA | WLAN |
|---|---|---|---|
| Video telephony | 0.50 | 0.25 | 0.01 |
| Video streaming | 0.17 | 1.00 | 0.5 |
| Music download | 0.00 | 0.02 | 0.44 |

TABLE 7

| without clipping | UMTS | UMTS HSDPA | WLAN |
|---|---|---|---|
| Video telephony | 10.0000 | 3.75 | 0.10 |
| Video streaming | 33.3333 | 50.00 | 13.02 |
| Music download | 0.00455 | 0.16 | 2.22 |

The invention claimed is:

1. A method of triggering a decision of a wireless communication system on a handover and/or of triggering a handover by means of at least one trigger signal, the method comprising the following steps:
   a) determining values of parameters of an algorithm, whereby the parameters are suitable to quantify at least an aspect of the quality of service of a radio link, the radio link connecting the wireless communication system with a terminal device, the parameters (QoS parameters) and the algorithm being generic with respect to different radio access technologies (RAT),
   b) processing the algorithm and thereby using the parameters,
   c) deciding, on the basis of the output of the algorithm, whether a trigger signal has to be transmitted to the communication system,
   d) transmitting a trigger signal to the communication system if the decision in step c) is in the affirmative
   wherein the algorithm is a metric is calculated according to $$\prod_i (f_i(x_i))^{a_i}$$

with $$x_i = \frac{QoS_{determined}(i)}{QoS_{application}(i)}, \text{ whereby } QoS_{determined}(i)$$

are the determined values of the generic QoS parameters, whereby $QoS_{application}(i)$ are values of the generic QoS parameters as requested by a particular application running on the terminal device, whereby $f_i(x_i)$ are mathematical functions and whereby $\alpha_i$ are weighting factors.

2. The method according to claim 1, wherein determining values of generic parameters comprises:
   a) receiving values of generic parameters, or mathematical representations of values of generic parameters, and/or
   b) receiving values of RAT-specific parameters and mapping them into values of generic parameters.

3. The method according to claim 1, wherein processing the algorithm is done with values received from the communication system and/or with values determined by the terminal device.

4. The method according to claim 1, wherein the algorithm is a metric or is based on heuristic rules.

5. The method according to claim 1, wherein the algorithm is a metric and its output is a scalar value.

6. The method according to claim 1, wherein determining values of generic parameters comprises:
   a) measuring and/or estimating them, and/or
   b) measuring and/or estimating RAT-specific parameters and mapping the obtained values into values of generic parameters.

7. The method according to claim 1, wherein $f_i(x_i)=x$.

8. The method according to claim 1, wherein the functions $f_i(x_i)$ are clip functions of the type $$clip_i(x_i) = \begin{cases} 0 & \text{for } x_i < \min_i \\ x_i & \text{for } \min_i < x_i < \max_i \\ \max_i & \text{for } \max_i < x_i \end{cases} \text{ with } x_i = \frac{QoS_{determined}(i)}{QoS_{application}(i)},$$

maximum allowed value $\max_i$ a maximum allowed value of the quantity.

9. The method according to claim 8, wherein determining the parameters of the radio link is carried out by the terminal device, and wherein the terminal device calculates the values of the metric after having received the weighting factors $\alpha_i$ from the communication system.

10. The method according to claim 1, wherein determining values of parameters and processing the algorithm is carried out for a multitude of radio links, and wherein a ranking of the radio link qualities is performed.

11. The method according to claim 1, wherein the method is at least partially carried out by means of a computer program.

12. Terminal device for accessing a wireless communication system, comprising:
a computer program product for triggering a decision of a wireless communication system on a handover and/or of triggering a handover, the computer program product comprising a computer readable medium, having thereon computer program code means, when said program is loaded, to make a computer executable for carrying out a method comprising the following steps:
determining values of parameters of an algorithm, whereby the parameters are suitable to quantify at least an aspect of the quality of service of a radio link, the radio link connecting the wireless communication system with a terminal device, the parameters (QoS parameters) and the algorithm being generic with respect to different radio access technologies (RAT),
processing the algorithm and thereby using the parameters,
deciding, on the basis of the output of the algorithm, whether a trigger signal has to be transmitted to the communication system,
transmitting a trigger signal to the communication system if the decision in step c) is in the affirmative;
wherein the algorithm is a metric is calculated according to $$\prod_i (f_i(x_i))^{\alpha_i}$$

with $$x_i = \frac{QoS_{determined}(i)}{QoS_{application}(i)}, \text{ whereby } QoS_{determined}(i)$$

are the determined values of the generic QoS parameters, whereby $QoS_{application}(i)$ are values of the generic QoS parameters as requested by a particular application running on the terminal device, whereby $f_i(x_i)$ are mathematical functions and whereby $\alpha_i$ are weighting factors.

13. Wireless communication system, comprising:
a computer program product for triggering a decision of a wireless communication system on a handover and/or of triggering a handover, the computer program product comprising a computer readable medium, having thereon computer program code means, when said program is loaded, to make a computer executable for carrying out a method comprising the following steps:
determining values of parameters of an algorithm, whereby the parameters are suitable to quantify at least an aspect of the quality of service of a radio link, the radio link connecting the wireless communication system with a terminal device, the parameters (QoS parameters) and the algorithm being generic with respect to different radio access technologies (RAT),
processing the algorithm and thereby using the parameters,
deciding, on the basis of the output of the algorithm, whether a trigger signal has to be transmitted to the communication system,
transmitting a trigger signal to the communication system if the decision in step c) is in the affirmative;
wherein the algorithm is a metric is calculated according to $$\prod_i (f_i(x_i))^{\alpha_i}$$

with $$x_i = \frac{QoS_{determined}(i)}{QoS_{application}(i)}, \text{ whereby } QoS_{determined}(i)$$

are the determined values of the generic QoS parameters, whereby $QoS_{application}(i)$ are values of the generic QoS parameters as requested by a particular application running on the terminal device, whereby $f_i(x_i)$ are mathematical functions and whereby $\alpha_i$ are weighting factors.

* * * * *